United States Patent
Chen

(10) Patent No.: US 12,212,460 B2
(45) Date of Patent: Jan. 28, 2025

(54) VARIABLE CONFIGURATION METHOD AND VARIABLE CONFIGURATION DEVICE THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/227,289

(22) Filed: Jul. 27, 2023

(65) Prior Publication Data

US 2024/0388501 A1    Nov. 21, 2024

(30) Foreign Application Priority Data

May 18, 2023    (TW) .................................. 112118440

(51) Int. Cl.
*H04L 41/0816*    (2022.01)
*H04L 41/5003*    (2022.01)
*H04L 43/067*    (2022.01)

(52) U.S. Cl.
CPC ...... *H04L 41/0816* (2013.01); *H04L 41/5003* (2013.01); *H04L 43/067* (2013.01)

(58) Field of Classification Search
CPC ............. H04L 41/0816; H04L 41/5003; H04L 43/067; H04L 41/147; H04L 41/149; H04L 41/16; H04L 41/0631; H04L 41/069; H04L 41/145; H04L 65/80; H04L 41/06; H04L 41/0663; H04L 41/5067; H04L 41/5025; H04L 43/08; H04L 43/16; H04L 63/1408; G06F 11/3452; G06F 11/008; G06F 11/0751; G06N 20/00; H04W 24/08; H04W 24/00; H04W 28/0268

See application file for complete search history.

(56) References Cited

U.S. PATENT DOCUMENTS 6,353,902 B1 *    3/2002 Kulatunge ............ H04L 41/149
                                                              714/48
2008/0250265 A1 *    10/2008 Chang ................. H04L 41/0663
                                                              714/4.12

(Continued)

OTHER PUBLICATIONS

Liu, Chang et al., Learning Causal Semantic Representation for Out-of-Distribution Prediction, Nov. 1, 2021, Microsoft Research Asia, Beijing.*

(Continued)

*Primary Examiner* — Madhu Woolcock
(74) *Attorney, Agent, or Firm* — Winston Hsu

(57) ABSTRACT

A variable configuration method and a variable configuration device thereof are disclosed. The variable configuration method for the variable configuration device includes receiving an incident prediction notification from a network at a first time instant, determining at least one variable at a second time instant in response to the incident prediction notification, and outputting the at least one variable at a third time instant. The incident prediction notification is used to instruct the variable configuration device to determine the at least one variable to respond to a quality of service (QoS) violation prediction at a fourth time instant later than the third time instant.

18 Claims, 10 Drawing Sheets

(56) References Cited

U.S. PATENT DOCUMENTS

| | | | |
|---|---|---|---|
| 2010/0077077 A1* | 3/2010 | Devitt | H04L 41/147 709/224 |
| 2013/0238534 A1* | 9/2013 | Nagaraj | H04L 41/5067 706/12 |
| 2013/0311673 A1* | 11/2013 | Karthikeyan | H04L 45/22 709/239 |
| 2015/0135012 A1* | 5/2015 | Bhalla | G06N 20/00 714/26 |
| 2015/0195192 A1* | 7/2015 | Vasseur | H04L 45/28 714/47.3 |
| 2017/0048109 A1* | 2/2017 | Kant | H04L 41/0836 |
| 2020/0044943 A1 | 2/2020 | Bor-Yaliniz | |
| 2020/0053591 A1* | 2/2020 | Prasad | H04W 28/0268 |
| 2020/0151576 A1* | 5/2020 | Gajewski | G06N 3/086 |
| 2021/0029559 A1* | 1/2021 | Agarwal | H04L 41/145 |
| 2021/0258230 A1* | 8/2021 | Tormasov | H04L 41/149 |
| 2021/0366268 A1* | 11/2021 | Jain | H04L 41/0823 |
| 2022/0322135 A1 | 10/2022 | Xu | |
| 2023/0155881 A1* | 5/2023 | Srinivasan | H04L 43/062 709/224 |

OTHER PUBLICATIONS

Horii et al., A Note on the Estimation Method of Causality Effects based on Statistical Decision Theory, IEICE Technical Report, IBISML2018-97 (Nov. 2018), The Institute of Electronics, Information and Communication Engineers, 2018, pp. 397-402.

\* cited by examiner

VARIABLE CONFIGURATION METHOD AND VARIABLE CONFIGURATION DEVICE THEREOF

BACKGROUND OF THE INVENTION

1. Field of the Invention

The present invention relates to a variable configuration method and a variable configuration device thereof, and more particularly, to a variable configuration method and a variable configuration device capable of improving efficiency and user experience.

2. Description of the Prior Art

As per the current specifications of 3GPP, after a RAN finds that the quality of service requirements cannot be achieved, the RAN issues a notification of PDU session modification to the PCF (via AMF and SMF), and let the PCF decide the policy to modify PDU session. This is too late and leads to a negative user experience given the disruption.

SUMMARY OF THE INVENTION

It is therefore an objective of the present invention to provide variable configuration method and a variable configuration device thereof to improve efficiency and user experience.

An embodiment of the present invention discloses a variable configuration method, for a variable configuration device, comprising receiving an incident prediction notification from a network at a first time instant; determining at least one variable at a second time instant in response to the incident prediction notification; and outputting the at least one variable at a third time instant, wherein the incident prediction notification is used to instruct the variable configuration device to determine the at least one variable to respond to a quality of service violation prediction at a fourth time instant, and the third time instant is earlier than the fourth time instant.

An embodiment of the present invention discloses a variable configuration device, comprising a storage circuit, configured to store a program code, wherein the program code comprises receiving an incident prediction notification from a network at a first time instant; determining at least one variable at a second time instant in response to the incident prediction notification; and outputting the at least one variable at a third time instant, wherein the incident prediction notification is used to instruct the variable configuration device to determine the at least one variable to respond to a quality of service violation prediction at a fourth time instant, and the third time instant is earlier than the fourth time instant; and a processing circuit, coupled to the storage circuit and configured to execute the program code stored in the storage circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
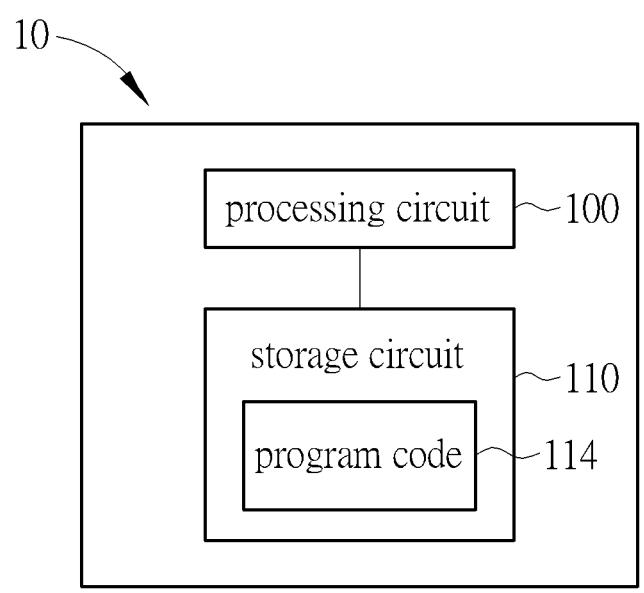
FIG. 1 is a schematic diagram of a variable configuration device according to an embodiment of the present invention.

FIG. 1 is a schematic diagram of a variable configuration device 10 according to an embodiment of the present invention. The variable configuration device 10 may be a network element (e.g., a policy charging function (PCF)), but not limited thereto. The variable configuration device 10 may include a processing circuit 100 and a storage circuit 110. The storage circuit 110 is configured to store a program code 114, and the processing unit 100 is able to read and execute the program code 114 with the storage circuit 110.

Figure 2:
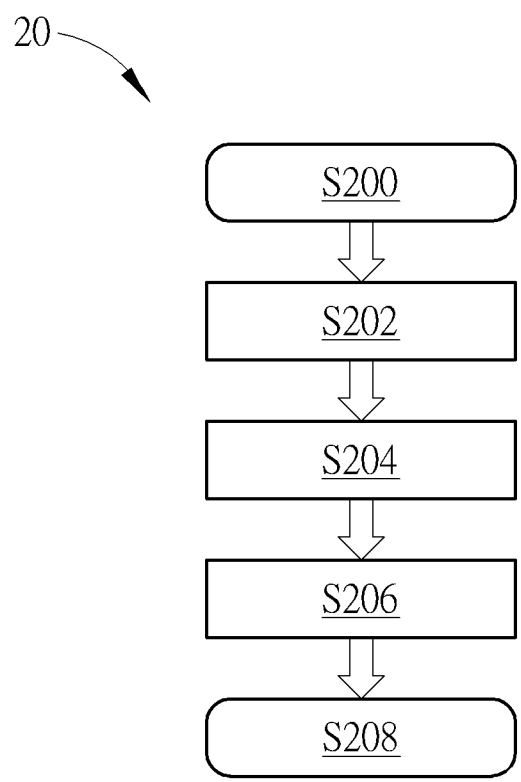
FIG. 2 is a schematic diagram of a variable configuration method according to an embodiment of the present invention.

FIG. 2 is a schematic diagram of a variable configuration method 20 according to an embodiment of the present invention. The variable configuration method 20 may be compiled into the program code 114 for the variable configuration device 10, and may include the following steps:

Step S200: Start.

Step S202: Receive an incident prediction notification (e.g., a fault prediction notification for a quality of service (QoS) violation prediction) from a network (e.g., a radio access network (RAN)) at a first time instant.

Step S204: Determine at least one variable at a second time instant later than the first time instant in response to the incident prediction notification.

Step S206: Output the at least one variable being determined (e.g., a policy temporal causal variable) at a third time instant later than the second time instant. The incident prediction notification is configured to instruct (the variable configuration device 10) to determine/decide the at least one variable so as to respond to the QoS violation prediction occurring at a fourth time instant later than the third time instant.

Step S208: End.

In other words, instead of waiting until the network finds that QoS requirement(s) cannot be met (and sends a notification of PDU session modification), the network, in step S202, may first predict (e.g., make the QoS violation prediction) and issue an incident prediction notification (which is different from the notification of PDU session modification) to the variable configuration device 10 to instruct the variable configuration device 10 to conduct the modification of protocol data unit (PDU) sessions. In step S204, the variable configuration device 10 may determine how to set/configure the policy for PDU session(s) (i.e., the at least one variable or policy temporal causal variable(s)). In step S206, the variable configuration device 10 transmits the (determined/decided) policy, such that the network may modify QoS parameter(s) or QoS characteristic(s) of QoS flow(s) of the relevant PDU session(s) to avoid the QoS violation predicted by the network in the QoS violation prediction. For example, when a video call fails to meet the QoS requirement(s) of QoS parameter(s) or QoS characteristic(s), directly slowing down (e.g., reducing the bandwidth of video or audio) may affect user experience. Therefore, in the present invention, the network may predict whether/when a video call cannot meet the QoS requirement(s) in the QoS violation prediction before a failure to meet the QoS requirement(s) for a video call actually occurs, and the variable configuration device 10 may correspondingly pre-determine/pre-decide the policy for modifying PDU session(s), thereby avoiding the occurrence of an incident in which a video call cannot meet the QoS requirement(s) of QoS parameter(s) or QoS characteristic(s).

Figure 3:
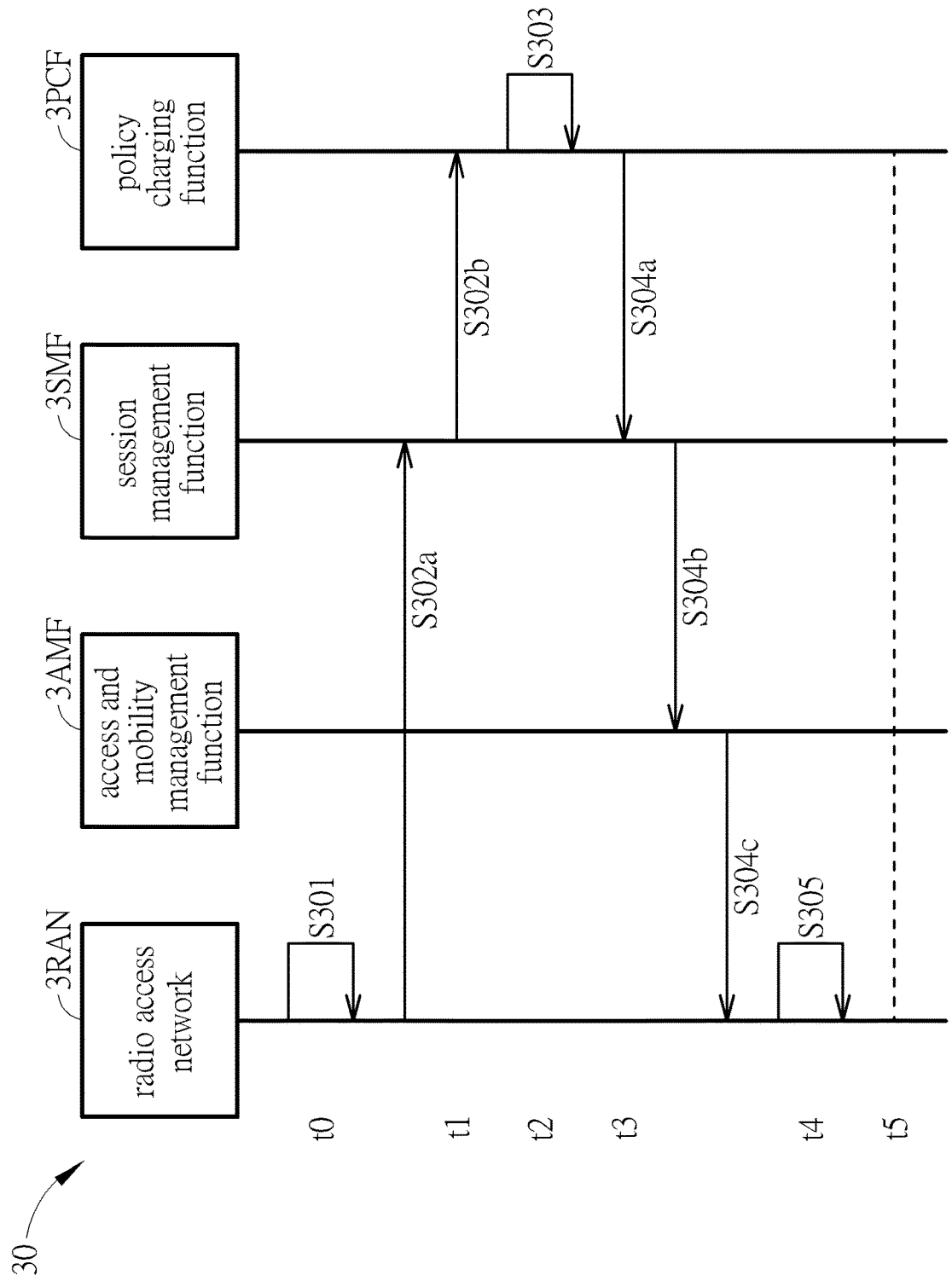
FIG. 3 is a sequence diagram of a variable configuration method according to an embodiment of the present invention.

FIG. 3 is a sequence diagram of a variable configuration method 30 according to an embodiment of the present invention. The variable configuration method 30 may include the following steps:

Step S301: A radio access network 3RAN, at a time instant t0, may perform QoS violation prediction and predict that QoS violation may occur (e.g., a video call unable to meet the QoS requirement(s)) at a time instant t5 (e.g., the fourth time instant).

In one embodiment, the RAN 3RAN may utilize models (e.g., a recurrent neural network (RNN), a long short-term memory (LSTM), a transformer, a RNN like model, or other similar discrete-time models) in step S301 to carry out predictive analytics of temporal causal variables. However, this kind of models are discrete time ones that can only deal with certain time step(s) (e.g., a time step t, t+Δt, or t+2×Δt) as opposed to time quantities: For example, a discrete-time model cannot handle certain time instant(s) (e.g., a time instant t, $\lim_{\Delta t \to 0}$ t+Δt, or $\lim_{\Delta t \to 0}$ t+2×Δt). A discrete-time model predicts what is most likely to happen in the future instead of when—it cannot accurately predict when it will happen. (This makes PDU session modification difficult when the QoS requirement(s) cannot be achieved.) Also, given the time scale of a discrete-time model (e.g., the length Δt of a time step) should match the time scale of the dynamic random process being modeled, it is hard to select an appropriate time scale for the discrete-time model.

In another embodiment, the RAN 3RAN may utilize a continuous time structural equation modeling (CTSEM) in step S301 to perform preventive analytics of temporal causal variables so as to predict the (exact) time instant (e.g., t5) at which the QoS requirement(s) cannot be met, as opposed to a time step used in a discrete-time model. (This way, the present invention may predict the time instant and modify PDU session(s) beforehand to achieve the QoS requirement(s).) Since CTSEM may involve (random/stochastic) differential equations, it belongs to continuous-time operations, and it catches/extracts temporal causal relations to make accurate predictions for better insight and decision of PDU session modification.

In CTSEM, temporal causal variables constitute a vector $\eta_h(t)$, which is a function of time and may satisfy $$\eta_h(t) = e^{A(t-t_0)}\eta_h(t_0) + A^{-1}\left[e^{A(t-t_0)} - I\right]\xi_h + A^{-1}\left[e^{A(t-t_0)} - I\right]Bz_h + M\sum_u x_{h,u}\delta(t-u) + \int_{t_0}^t e^{A(t-s)}GdW_h(s), \text{ or} \quad \text{(Equation 1)}$$

$$d\eta_h(t) = \left(A\eta_h(t) + \xi_h + Bz_h + M\sum_u x_{h,u}\delta(t-u)\right)dt + GdW_h(t). \quad \text{(Equation 2)}$$

The matrix A may use auto effects on the diagonal and cross effects on the off-diagonal to qualitatively characterize/capture the temporal relationships of the vector $\eta_h(t)$. The matrix I is the identity matrix. The random vector $\xi_h$ may determine the long-term trend/level of the vector $\eta_h(t)$ and may follow/satisfy a distribution $\xi_h \sim N(\kappa, \phi_\xi)$, where the vector $\kappa$ may represent continuous time intercept(s), and the matrix $\phi_\xi$ may represent a covariance (e.g., the covariance across QoS flows). The matrix B may represent the effect of a (fixed) time-independent predictor vector $z_h$ on the vector $\eta_h(t)$, and the number of rows of the matrix B may differ from the number of columns of the matrix B. The time-independent predictor vector $z_h$ may usually be variables that differs between different QoS flows, but may be constant within different QoS flows for the time range in question. The time-dependent predictor vector $x_{h,u}$ may be observed at a time instant u and may be treated as impacting the vector $\eta_h(t)$ only at the time instant u, and the effect of impulses, each of which is formed/described by $x_{h,u}\delta(t-u)$, on the vector $\eta_h(t)$ may be represented by the matrix M. The vectors $W_h(s)$ may be independent random walks in continuous time (e.g., Wiener processes), and $dW_h(s)$ may be a stochastic error term. The lower triangular matrix G may represent the effect of changes in the vector $\eta_h(t)$. The matrix Q satisfying $Q=GG^T$ may represent a variance-covariance matrix of the diffusion process in continuous time. The (component) value(s) of the matrix A, B, M, G, the vector $\xi_h$, $z_h$, $x_{h,u}$, $W_h(s)$, the time instant u, or the initial time instant $t_0$ may be obtained/determined/calculated by fitting Equation 1 or 2 to data received, transmitted, or stored by the RAN 3RAN. In one embodiment, t of the vector $\eta_h(t)$ may be the time instant t5 using substitution method.

CTSEM is focused on providing an accessible workflow, for full information maximum likelihood estimation of continuous time multivariate autoregressive models (with random intercepts), for both time series and panel data. In one embodiment, the dynamic random process modeled is one process (i.e., a time series and a single device) as opposed to multiple processes (i.e., panel data and multiple devices); correspondingly, h of the vector $\eta_h(t)$ may be equal to 1, and there is only one vector $\eta_1(t)$. In another embodiment, the vector $\eta_h(t)$ with h ranged from 1 to n may correspond to different QoS flows, so n QoS flows may correspond to the vectors $\eta_1(t)$ to $\eta_n(t)$, respectively, where h and n are positive integers.

In an embodiment, a temporal causal variable may be, for example, a lowest flow bit rate (LFBR) for uplink (UL) and/or downlink (DL) in the case of a guaranteed bit rate (GBR) QoS flow, a highest flow bit rate (HFBR) for UL and/or DL in the case of a GBR QoS flow, a packet loss rate (PLR) for UL and/or DL in the case of a GBR QoS flow, a session-aggregate bit rate (Session-ABR) (in a PDU session level) in the case of a non-guaranteed bit rate (non-GBR) QoS flow, a user equipment-aggregate bit rate (UE-ABR) in the case of a non-GBR QoS flow, a packet delay time (PDT), a packet error rate (PER), or a data burst volume (for delay-critical GBR resource-type only). For the h-th QoS flow of a PDU session, the vector $\eta_h(t)$ of temporal causal variables may be a multidimensional vector constituted by LFBR, HFBR, PLR, Session-ABR, UE-ABR, PDT, or PER, and the vector $\eta_h(t)$ of temporal causal variables (for monitoring QoS violation) may be expressed as (LFBR$_h$, HFBR$_h$, PLR$_h$, Session-ABR, UE-ABR, PDT$_h$, PER$_h$).

In one embodiment, the RAN 3RAN in step S301 may compare the relationship between temporal causal variable(s) at one certain time instant (e.g., t5) and its/their corresponding preset/predetermine threshold(s) (e.g., policy temporal causal variable(s)) (e.g., whether a temporal causal variable is greater than or less than its corresponding policy temporal causal variable), to monitor QoS violation or perform QoS violation prediction. For example, when the LFBR at the time instant t5 is less than the guaranteed flow bit rate (GFBR), when the HFBR at the time instant t5 is greater than the maximum flow bit rate (MFBR), when the PLR at the time instant t5 is greater than the maximum packet loss rate (Maximum-PLR), when the Session-ABR at the time instant t5 is greater than the session-aggregate maximum bit rate (Session-AMBR), when the UE-ABR at the time instant t5 is greater than the UE-Aggregate Maximum Bit Rate (UE-AMBR), when the PDT at the time instant t5 is greater than the packet delay budget (PDB), or when the PER at the time instant t5 is greater than the maximum packet error rate (Maximum-PER), the RAN 3RAN may determine that QoS violation occurs at the time instant t5 in the QoS violation prediction. That is, over time, when the vector $\eta_h(t)$ of temporal causal variable(s) provided by Equation 1 or 2 has one or more of the conditions "LFBR<GFBR", "HFBR>MFBR", "PLR>Maximum-PLR", "Session-ABR>Session-AMBR", "UE-ABR>UE-AMBR", "PDT>PDB", and "PER>Maximum-PER" holding true, QoS violation is monitored/detected in the QoS violation prediction.

Figure 10:
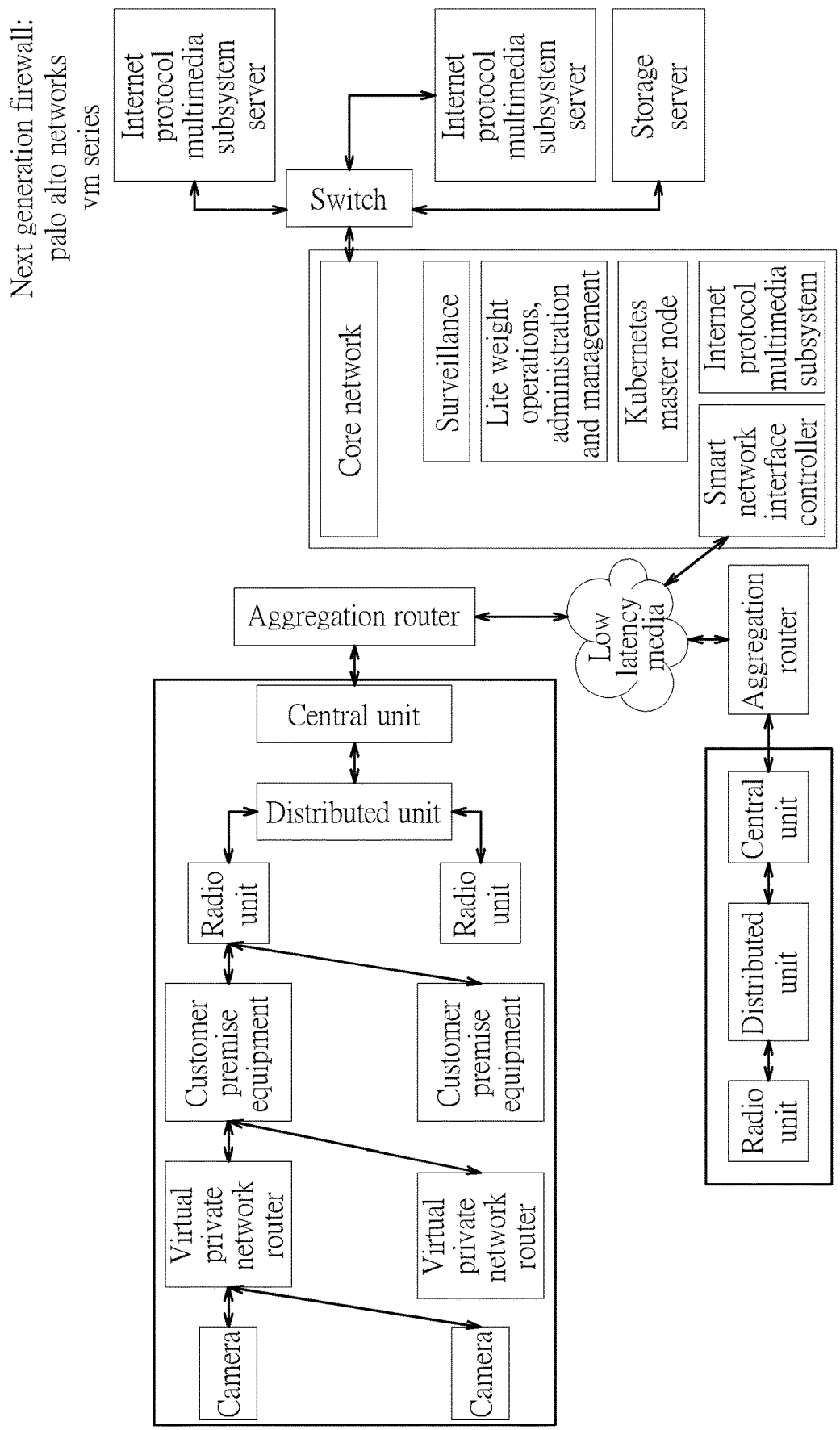
FIG. 10 is a schematic diagram of a communication system according to an embodiment of the present invention.

In one embodiment, a central unit (CU) (e.g., as shown in FIG. 10) or a resource management unit of a CU of the RAN 3RAN may perform CTSEM prediction or the QoS violation prediction, predict the possibility of QoS violation, predict whether QoS violation may occur, or determine at which time instant QoS violation may occur in step S301.

Step S302a: The RAN 3RAN may send a notification about PDU session modification (e.g., an incident prediction notification) to a session management function 3SMF (SMF) via an access and mobility management function (AMF) 3AMF.

Step S302b: The SMF 3SMF, at a time instant t1 (e.g., the first time instant), may notify a PCF 3PCF to decide the policy (e.g., the at least one variable, policy temporal causal variable(s), QoS profiles, alternative profiles, or Session-AMBR) to modify PDU session(s) (using the incident prediction notification) (after receiving the notification from the RAN 3RAN).

In other words, instead of waiting until the RAN 3RAN finds QoS requirement(s) cannot be achieved, the RAN 3RAN issues an incident prediction notification about PDU session modification to the PCF 3PCF and let the PCF 3PCF decide the policy to modify PDU session, and a new preventive analytics tool for better insight and decision of PDU session modification are proposed. Specifically, the RAN 3RAN may send the incident prediction notification in steps S302a and S302b (corresponding to step S202) to inform/tell/instruct the PCF 3PCF (via the AMF 3AMF or the SMF 3SMF) some time before the (predicted) time instant t5 to decide/determine the policy to modify PDU session(s), and the policy is at least for the prediction of (upcoming) QoS violation of the QoS violation prediction at the (upcoming) time instant t5. That is, the RAN 3RAN may indicate that the policy/strategy for modifying PDU session(s) should be re-determined/reevaluated before the (predicted) time instant t5 so as to ensure the satisfaction of QoS requirement(s) at least at the time instant t5.

In an embodiment, the policy (e.g., at least one variable or at least one policy temporal causal variable of the at least one variable) may include, for example, QoS profile(s), alternative profile(s), or session-AMBR. A QoS profile may include 5th generation mobile networks (5G) QoS Identifier (5 QI), allocation and retention priority (ARP), a GFBR for UL and/or DL in the case of a GBR QoS flow, a MFBR for UL and/or DL in the case of a GBR QoS flow, a Maximum-PLR for UL and/or DL in the case of a GBR QoS flow, a delay critical resource type in the case of a GBR QoS flow, a notification control in the case of a GBR QoS flow, a reflective QoS attribute (RQA) in the case of a Non-GBR QoS flow, a Session-AMBR (in a PDU session level) in the case of a Non-GBR QoS flow, a UE-AMBR (in a UE level) in the case of a Non-GBR QoS flow, or other QoS parameters. QoS characteristics derived from the 5 QI in QoS parameters may include a resource type (GBR, delay critical GBR or non-GBR), a priority level, a PDB, a Maximum-PER, an averaging window (for GBR and delay-critical GBR resource-type only), or a maximum data burst volume (for delay-critical GBR resource-type only). A PDU session may include the first QoS flow to the n-th QoS flow, so the policy may be expressed as (TCV$_1$, TCV$_2$, ..., TCV$_n$). For the h-th QoS flow of a PDU session, the vector TCV$_n$ may include m policy temporal causal variables (e.g., Session-AMBR), where m is a positive integer. Policy temporal causal variables of the h-th QoS flow constitute the vector TCV$_n$, which may be expressed as (QP$_h$), (QP$_h$, Session-AMBR), or (GFBR$_h$, MFBR$_h$, Maximum-PLR$_h$, UE-AMBR, PDB$_h$, Maximum-PER$_h$, Session-AMBR), where QP$_h$ may represent a QoS profile of the h-th QoS flow.

Step S303: The PCF 3PCF, at a time instant t2 (e.g., the second time instant), may decide the policy (in response to the incident prediction notification). In one embodiment, the PCF 3PCF may consider input(s) it receives and utilize an algorithm to decide the policy.

For example, in one embodiment, the PCF 3PCF may receive input(s) from a network data analytics function (NWDAF) (e.g., various network data analysis), input(s) of a unified data repository (UDR) function (e.g., information about subscriptions (e.g., spending limits), Nudr_DM_Notify, or application specific information), input(s) of an application function (e.g., Application/Service Info), input(s) of an application server, or input(s) of a video streaming server before or during step S303, so as to decide the policy according to the input(s). In one embodiment, the spending limit may, for example, be unlimited or have a specific data limit (e.g., a limit of 1 GB).

In one embodiment, the algorithm used by the PCF 3PCF in step S303 may be, for example, Bayesian optimization (BO), causal Bayesian optimization (CBO), or dynamic causal Bayesian optimization (DCBO). The PCF 3PCF (at the time instant t2) may determine/calculate/select optimal values/results of the policy (e.g., at least one policy temporal causal variable serving as independent variable(s)) by utilizing BO, CBO, or DCBO (or by applying BO, CBO, or DCBO to at least one data (e.g., data extracted from signal(s) sent, received or stored by the PCF 3PCF)) in step S303 so as to achieve the minimum value of a loss function at any given time instant (e.g., t4). That is to say, the PCF 3PCF may decide optimal policy temporal causal variable(s) (e.g., the vector TCV$_h$) for one certain time instant (e.g., t4) in step S303 (corresponding to step S204). The loss function L( ) (which may serve as an objective function) may be related to the difference(s) between temporal causal variable(s) and policy temporal causal variable(s) at one certain time instant (e.g., t4); for example, the loss function L( ) may satisfy $$L() = \sum_{h=1}^{n} L_h() = \sum_{h=1}^{n} (GFBR_h - LFBR_h, HFBR_h - MFBR_h,$$

$PLR_h$–Maximum-$PLR_h$, Session-ABR–Session-AMBR, UE-ABR–UE-AMBR, $PDT_h$–$PDB_h$, $PER_h$–Maximum-$PER_h$).

Figure 4:
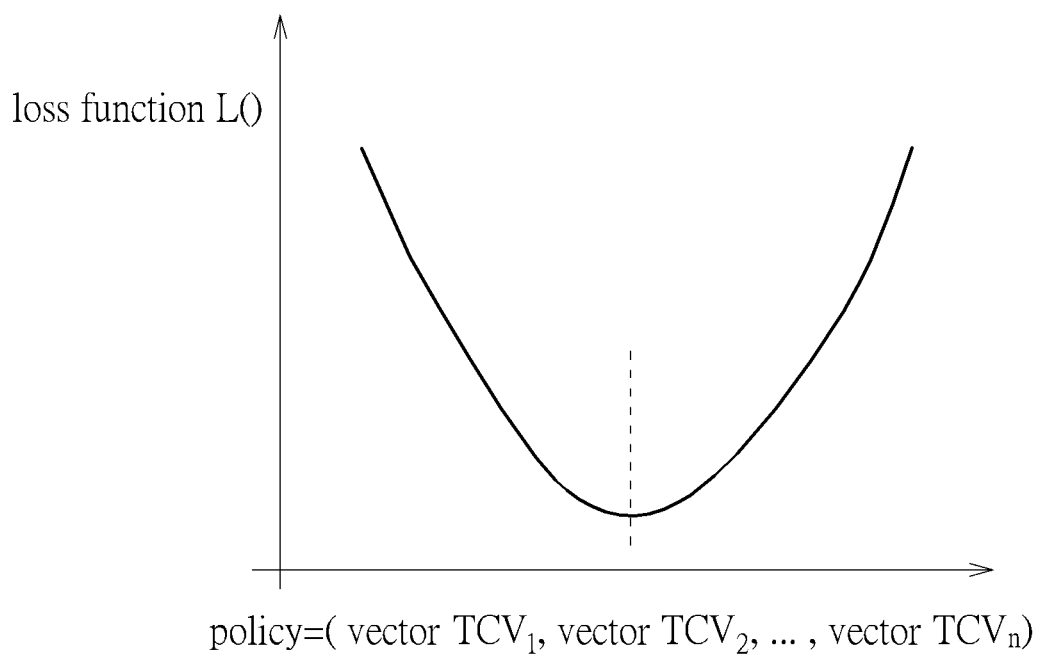
FIG. 4 is a schematic diagram of the relationship between the loss function and the vectors formed/constituted by policy temporal causal variables at one certain time instant according to an embodiment of the present invention.

Take BO as an example. BO is a black-box optimization algorithm for solving extremum problems of functions whose expressions are unknown. For example, $L(TCV_1, \ldots, TCV_n)$=uef($TCV_1, \ldots, TCV_n$), where L( ) may represent the loss function of a model, uef( ) may represent a function whose expression is unknown. For example, FIG. 4 is a schematic diagram of the relationship between the loss function L( ) and the vectors $TCV_1$-$TCV_n$ formed/constituted by policy temporal causal variable(s) at one certain time instant (e.g., t4) according to an embodiment of the present invention. However, FIG. 4 is only for illustration to specify that there are relationships among the loss function L( ) and the vectors $TCV_1$-$TCV_n$, while the expression of the relationship function uef( ) among the loss function L( ) and the vectors $TCV_1$-$TCV_n$, which are formed/constituted by policy temporal causal variable(s), is unknown in most cases. Coordinates of one single point on the horizontal axis of FIG. 4 may correspond to a point in the multi-dimensional space, which is formed/constituted by policy temporal causal variable(s) of the vectors $TCV_1$-$TCV_n$.

Figure 5:
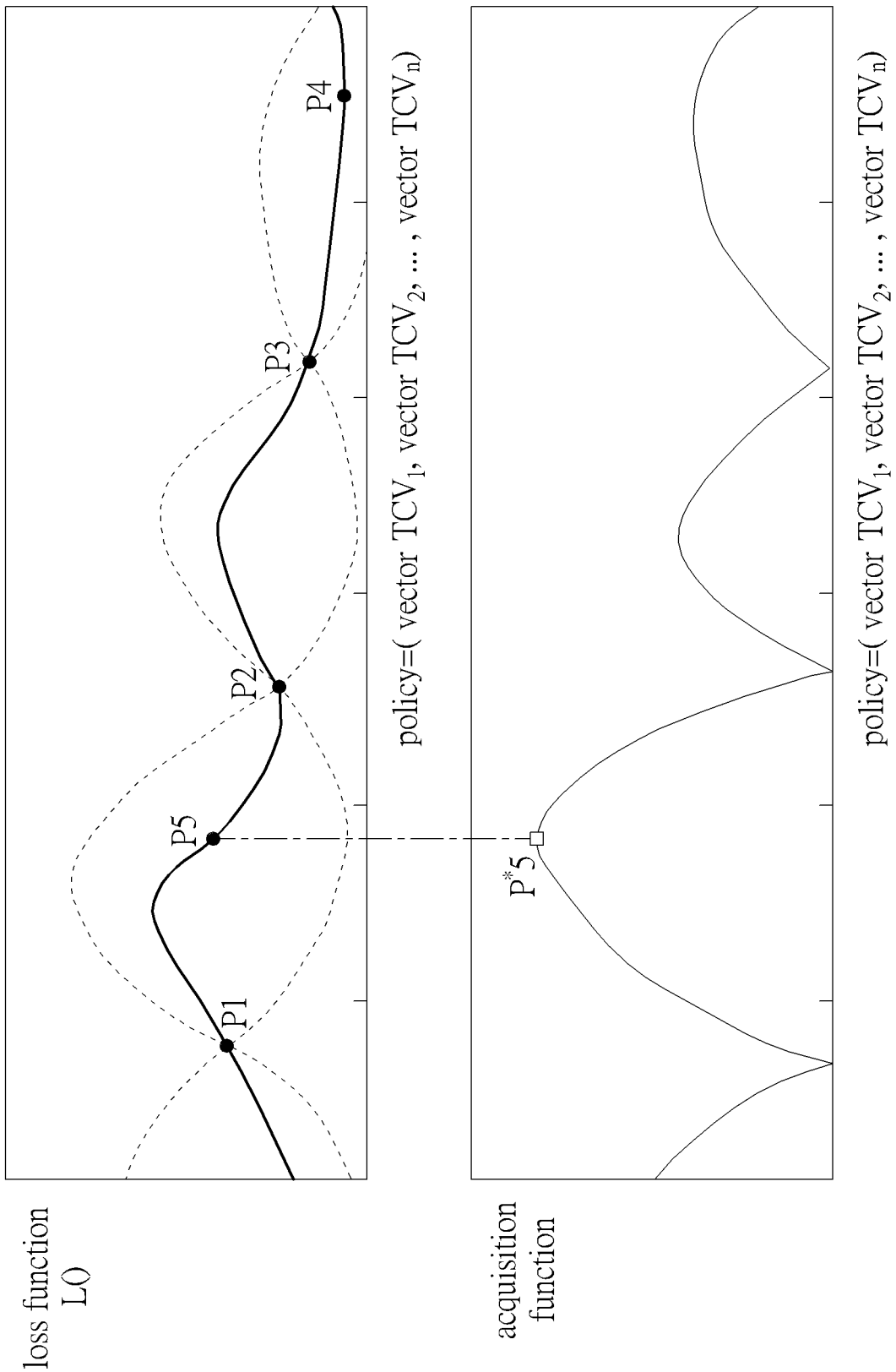
FIG. 5 is a schematic diagram of BO for a one-dimensional problem according to an embodiment of the present invention.

Since the expression of the relationship function uef( ) is unknown, BO may roughly fit the relationship function uef( ) using partial/finite sampling points and leverage information of previous sampling point(s) to determine the next sampling point so as to find extremum point(s). For example, FIG. 5 is a schematic diagram of BO for a one-dimensional problem according to an embodiment of the present invention, where the thick solid line represents estimated function values of the loss function L( ) solid black points P1 to P5 respectively represent sampling points which have been found, the area enclosed by two dotted lines represents the fluctuation range (centered on a mean value and proportional to a standard deviation) of the loss function L( ) at each point, and the thin solid line represents an acquisition function. The idea of BO is to first generate an initial candidate solution set (e.g., policy temporal causal variable(s) of the vectors $TCV_1$-$TCV_n$, and the loss function L( ) corresponding to the solid black point P1), then determine/search for the next sampling point (e.g., the solid black point P2), which may have an extreme value, based on the initial candidate solution set (e.g., by estimating mean value(s) and variance(s) of the true loss function based on the function values of the sampling points that have been found (e.g., the loss function corresponding to the solid black point P1)), repeatedly search for the next sampling point (e.g., the solid black points P3-P5), which may have an extreme value, until the iteration terminates, and add all the searched sampling points (e.g., the solid black points P1-P5) to the candidate solution sets. Finally, a (global) extremum point is found/selected from the sampling points of the candidate solution sets (which have been found since the beginning) to serve as the extremum of the loss function L( ) and thus optimal policy temporal causal variable(s) Session-AMBR or $QP_1$-$QP_n$ (e.g., including policy temporal causal variable(s) $GFBR_h$, $MFBR_h$, Maximum-$PLR_h$, $PDB_h$, or Maximum-$PER_h$ of the vector $TCV_h$), which minimize(s) the loss function L( ) (e.g., the minimum loss function in response to the optimal policy temporal causal variable(s) Session-AMBR or $QP_1$-$QP_n$), are returned as the solution of the problem (e.g., the policy temporal causal variable(s) of the vectors $TCV_1$-$TCV_n$ and the loss function L( ) corresponding to the solid black point P5), thereby finding/deciding the policy for certain time instant (e.g., t4) in step S303.

According to result(s) of Gaussian process regression, an acquisition function (which is used to measure the degree that each point of the loss function is worth exploring) may be constructed to find a (relative) extremum of the acquisition function so as to determine the next sampling point of the loss function. The acquisition function represented by the thin solid line in FIG. 5 may be constructed according to mean values and variances; that is, the acquisition function may be a function of mean values and variances. The estimation of the possibility that a point (e.g., one of the solid black points P1-P5) is an extremum point of the loss function reflects the degree that the point is worth searching. A relative extremum point of the acquisition function may correspond to the next sampling point of the loss function: For example, the point P*5 represented by the rectangular box in FIG. 5 is the maximum point of the acquisition function and may correspond to the next sampling point (i.e., the solid black point P5) of the loss function (according to the corresponding vectors $TCV_1$-$TCV_n$). The acquisition function may be, for example, knowledge gradient (KG), entropy search(ES), or predictive entropy search (PES).

The algorithm of the present invention may use Gaussian process regression to predict the probability distribution of a function value of the loss function L( ) at any point based on the function values of the loss function L( ) at a set of sampling points. Gaussian process regression may extend to observations with independent normally distributed noise of known variance. The variance may be unknown, so it may assume that the noise is of common variance and that the noise includes the variance as a hyperparameter. The present invention uses the posterior mean of the Gaussian process that includes noise, which is a drift value rather than the noise of a Signal to Interference plus Noise Ratio (SINR). In one embodiment, environmental factors such as temperature and humidity or measurement errors (e.g., measurement errors of LFBR) may cause a drift value of the loss function with respect to certain policy temporal causal variable(s). In other words, a selected sampling point (e.g., the solid black point P5) may not select/correspond to the desired/expected extremum of the functional relationship uef( ) but may select/correspond to a relatively optimized extremum close to the desired/expected extremum of the functional relationship uef( ) (i.e., the extremum of the functional relationship uef( ) disturbed by noise).

In one embodiment, there may be many independent variables to be considered by the algorithm of the present invention (in addition to policy temporal causal variables $QP_1$-$QP_n$, Session-AMBR, and independent variables $O_1$-$O_q$). When the spatial dimension grows, the performance of BO may deteriorate exponentially. Therefore, at step S303, the algorithm of the present invention may extend to CBO. In other words, the present invention may find the causal relationship between the loss function L( ) the vectors $TCV_1$-$TCV_n$, and/or other independent variable(s) when the loss function L( ) is related to the vectors $TCV_1$-$TCV_n$ and/or other independent variable(s). CBO may perform optimization only for causal variables directly related to the loss function L( ).

Figure 6:
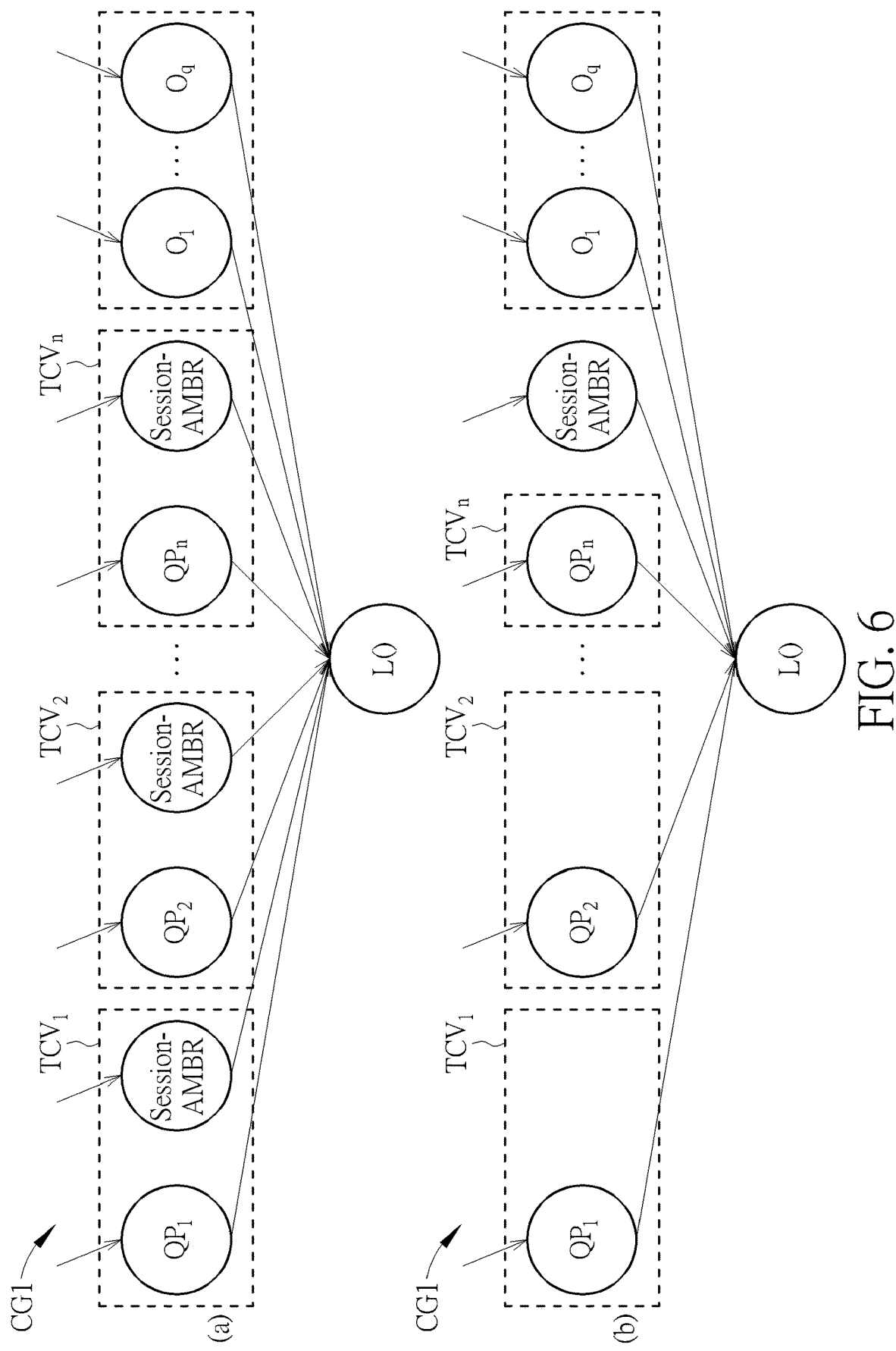
FIG. 6 is a schematic diagram of part of a causal graph according to an embodiment of the present invention.

For example, FIG. 6 is a schematic diagram of part of a causal graph CG1 according to an embodiment of the present invention. In FIG. 6, (a) and (b) respectively illustrate two possibilities of the causal graph CG1. The loss function L( ) independent variables $O_1$-$O_q$ (which is optional and may be omitted), policy temporal causal variable(s) of the vectors $TCV_1$-$TCV_n$ serving as causal variables constitute the causal graph CG1 used by a causal model, where q is a positive integer. As shown in FIG. 6, the causal graph CG1 shows the causal relationship between the causal variables. Since the independent variables $O_1$-$O_q$ and policy temporal causal variable(s) of the vectors $TCV_1$-$TCV_n$ of the causal graph CG1 directly point to or affect the loss function L( ), the causal intrinsic dimensionality found by CBO may be n×m+q (or n×m), and there are n×m+q independent variables (or n×m independent variables) that are selected/searched out and fed into the loss function L( ) of CBO for optimization. Accordingly, the values/results of n×m+q causal variables (or n×m causal variables) that are able to minimize the loss function L( ) are calculated/found. In other words, the causal graph CG1 may significantly improve the ability to reason about optimal decision making strategies, thereby decreasing optimization cost and avoiding suboptimal solutions. Moreover, the causal intrinsic dimensionality of CBO is given by the number (e.g., n×m or n×m+q) of the independent variables $O_1$-$O_q$ and the policy temporal causal variable(s) of the vectors $TCV_1$-$TCV_n$, which are causes/parents of the loss function L( ), rather than the number of causal variables (not shown) which are causes of the independent variables $O_1$-$O_q$ and the vectors $TCV_1$-$TCV_n$, thereby improving the ability to reason about optimal decision making strategies.

In one embodiment, a causal model for optimization may be selected based on maximum a posterior (MAP) and point estimation to obtain/derive a causal graph of a loss function, policy temporal causal variable(s) of the vectors $TCV_1$-$TCV_n$, and/or other independent variable(s). Accordingly, causal variables (e.g., $cv_{(i-1)}$, $cv_i$, $cv_{(j-1)}$, and $cv_j$) of a causal graph of the causal model (e.g., which causal variables are selected, the number of the causal variables, which attributes a causal variable has, or the number of the attributes of a causal variable) and a causal structure (e.g., C) of the causal graph (e.g., how causal variables or their attributes connect to each other) are obtained/determined/found together (at the same time, at a time, or in one go) (namely, the causal variables are learned along/together with the causal structure), so the causal variables and the causal structure may interact/affect/constrain each other. Deciding the causal variables and the causal structure simultaneously/parallelly may avoid problems incurred by deciding first causal variables and then a causal structure (e.g., the causal model may differentiate (a) from (b) of FIG. 7, and vice versa, thereby preventing the problem of indistinguishability).

Figure 7:
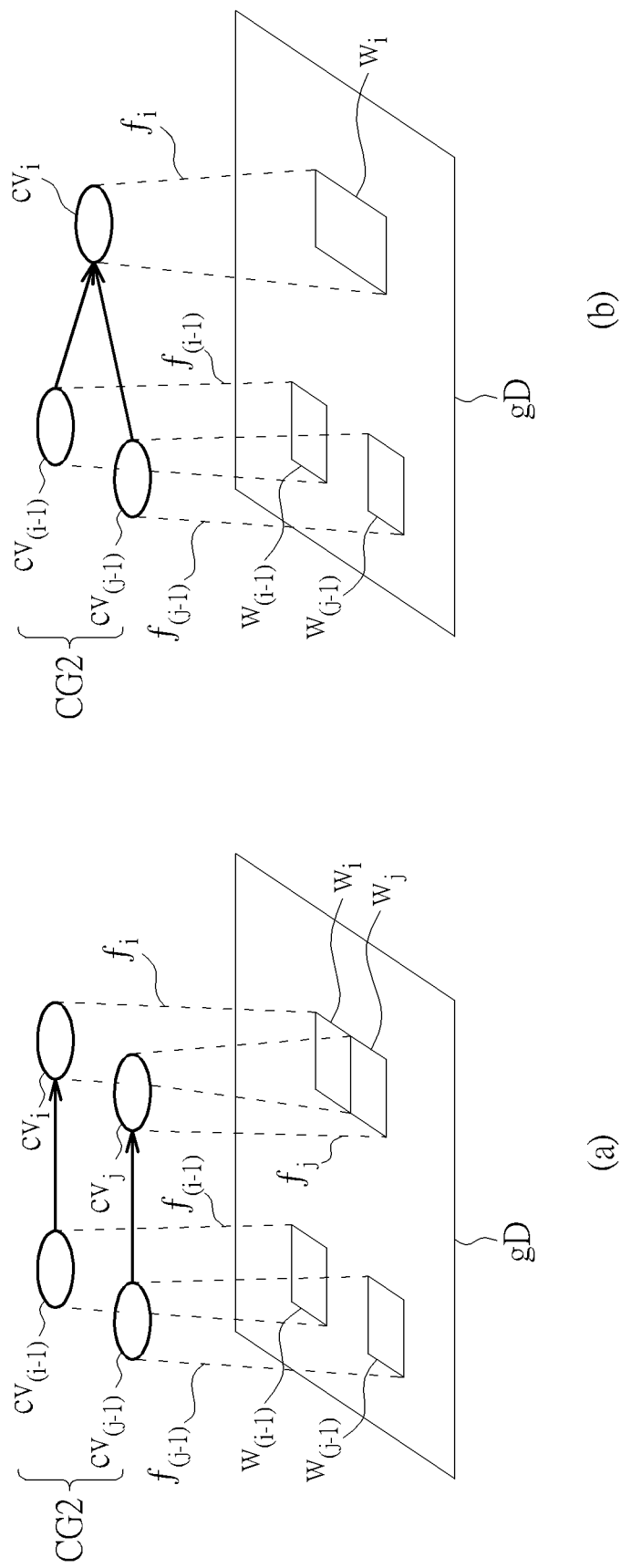
FIG. 7 is a schematic diagram of grounding data and part of a causal graph according to an embodiment of the present invention.

For example, FIG. 7 is a schematic diagram of grounding data gD and part of a causal graph CG2 according to an embodiment of the present invention. In FIG. 7, (a) and (b) respectively illustrate two possibilities of the grounding data gD and the causal graph CG2. The causal graph CG2 may serve as the causal graph CG1. In FIG. 7, a causal structure of the causal graph CG2 may present the relationship between causal variables (e.g., $cv_{(i-1)}$, $cv_i$, $cv_{(j-1)}$, and $cv_j$). Observation functions $f_{(i-1)}$, $f_i$, $f_{(j-1)}$, and $f_j$ may be used to map subdata $w_{(i-1)}$, $w_i$, $w_{(j-1)}$, and $w_j$ of the grounding data gD to the causal variables $cv_{(i-1)}$, $cv_i$, $cv_{(j-1)}$, and $cv_j$ so as to show the relationship between the causal variables $cv_{(i-1)}$, $cv_i$, $cv_{(j-1)}$, $cv_j$ and the subdata $w_{(i-1)}$, $w_i$, $w_{(j-1)}$, $w_j$ of the grounding data gD. Here, i, j are positive integers. The mapping here is on a basis of the corresponding subdata (e.g., $w_{(i-1)}$, $w_i$, $w_{(j-1)}$, $w_j$) (e.g., framed area(s) in FIG. 7) instead of the (whole) grounding data gD. For example, if the causal variable $cv_{(i-1)}$ corresponds to the policy temporal causal variable(s) of the vectors $TCV_1$, the subdata $w_{(i-1)}$ is related to (attributes of) the causal variable $cv_{(i-1)}$ (for example, the subdata $w_{(i-1)}$ is related to all data about the policy temporal causal variable(s) of the vectors $TCV_1$). In other words, with Bayesian networks, Bayesian probability mechanism may combine the number of causal variables (i.e., which policy temporal causal variable(s) of the vectors $TCV_1$-$TCV_n$, or which of the independent variables $O_1$-$O_q$ is selected/searched out to create the causal graph CG2), states of the causal variables (e.g., including the causal variables $cv_{(i-1)}$, $cv_i$, $cv_{(j-1)}$, and $cv_j$), a causal structure of the causal variables, or observation functions for the causal variables (e.g., including the observation functions $f_{(i-1)}$, $f_i$, $f_{(j-1)}$, and $f_j$) and draw relevant joint inferences to explain/interpret the grounding data gD, thereby creating the causal graph CG2.

In one embodiment, a posterior probability $P(f_i,C|w_i)$ of assigning the subdata $w_i$ of the grounding data gD to the observation function $f_i$ and a causal structure C of the causal graph CG may be maximized so as to determine/derive/select the corresponding causal structure C and the corresponding causal variable $cv_i$ based on the subdata $w_i$ of the grounding data gD (i.e., by extracting policy temporal causal variable(s) of the vectors $TCV_1$-$TCV_n$, the loss function L( ), or the independent variables $O_1$-$O_q$ from the grounding data gD).

In one embodiment, the posterior probability $P(f_i,C|w_i, \text{Int})$ may satisfy $P(f_i,C|w_i, \text{Int}) \propto P(f_i,C) P(w_i|f_i,C, \text{Int})$ according to the Bayesian rule, where $f_i$ may denote the corresponding observation function, C may denote the corresponding causal structure, $w_i$ may denote part of the grounding data gD (e.g., subdata), and Int may denote intervention (which may be omitted). In one embodiment, the posterior probability $P(f_i,C|w_i)$ may be proportional to $P(f_i,C) P(w_i|f_i,C)$ or $\Pi_{t=0}^{T} P(w_{i,t}|s_{t-1},C, f_i)^{(T-t)^{-\gamma}}$, where $w_{i,t}$ may denote the subdata corresponding to the causal variable $cv_i$ at a time instant t, C denotes the causal structure, $s_{t-1}$ may denote state(s) (of all causal variables) at a time instant t-1, T may denote a current/present time instant, and γ may be a real number such as 0 or 0.5, but is not limited thereto. In one embodiment, $P(w_i|f_i,C)$ may be $\Pi_{t=0}^{T} P(w_{i,t}|s_{t-1},C, f_i)$. In embodiment, $P(w_{i,t}|s_{t-1},C, f_i)$ may be $$\frac{1}{|R_{s_t}|}\prod_{i=1}^{Ncv} P(s_{i,t}|s_{t-1}, C) \text{ or } \sum_{s_t} P(w_{i,t}|s_t, f_i)\prod_{i=1}^{Ncv} P(s_{i,t}|s_{t-1}, C),$$

where $s_{i,t}$ may donate the state (e.g., the corresponding value) of the causal variable $cv_i$ at the time instant t, $s_t$ may denote the state(s) (of all causal variables) at the time instant t, Ncv may denote the total number of all causal variables (e.g., including the causal variables $cv_{(i-1)}$, $cv_i$, $cv_{(j-1)}$, and $cv_j$), Ncv is a positive integer, and $R_{s_t}$ may denote the data amount of the subdata $w_i$ which is compatible with the state $s_i$ of the causal variable $cv_i$ within the grounding data gD. In one embodiment, the present invention may select/find the causal variable $cv_i$ that minimizes the data amount $R_{s_t}$, such that data within the grounding data gD which are frequently used (e.g., the subdata $w_i$) may be cut into finer pieces than those which are rarely used.

In one embodiment, the grounding data gD may be obtained or derived from the space of all observable samples, and thus may be referred to as observation data. In one embodiment, the grounding data gD may include or be related to data extracted from signal(s) sent or received by the PCF 3PCF (e.g., input(s) from an NWDAF) at any time in any manner As shown in FIG. 7, each causal variable (e.g., $cv_i$) may correspond to an observation function (e.g., $f_i$). In one embodiment, an observation function (e.g., $f_i$) may be calculated/derived using a causal semantic generative (CSG) model so as to predict low-dimensional state attributes (e.g., a state of the causal variable $cv_i$ or its attribute(s)) from high-dimensional environmental variables (e.g., the grounding data gD). When causal variables (e.g., the independent variables $O_1$-$O_q$ serving as causal variables, policy temporal causal variable(s) of the vectors $TCV_1$-$TCV_n$ serving as causal variables, or causal variables $cv_{(i-1)}$, $cv_i$, $cv_{(j-1)}$, and $cv_j$) are manually defined, each causal variable (e.g., $cv_i$) may have a dedicated CSG observation function to ground the causal variable onto the corresponding subdata (e.g., the $w_i$) (e.g., a framed area in FIG. 7). (For example, causal variables are manually defined by domain experts (nonautomatically and individually); alternatively, causal variables are defined automatically using a program with rules described by domain experts manually.) This means that subdata (e.g., the subdata $w_{(i-1)}$, $w_i$, $w_{(j-1)}$, or $w_j$ corresponding to the framed area in FIG. 7) is determined based on the definition(s) of particular causal variable(s) from domain expert(s). Moreover, the CSG model may avoid deeming variation factor(s) cause(s) of a causal variable (e.g., $cv_i$), and may correctly determine semantic factor(s) to be the cause(s) of the causal variable (e.g., $cv_i$). In one embodiment, variation factor(s) and semantic factor(s) may constitute/belong to observation data. In one embodiment, the CSG model is primarily based on causal invariance principle and involves variational Bayes.

In one embodiment, the observation function $f_i$ may satisfy $s_{i,t}=f_i(w_{i,t})$. In one embodiment, the observation function $f_i$ may be implemented using multivariate Gaussian distribution: For example, the observation function $f_i$ may satisfy $$f_i(w_i, z) = N\left(\begin{pmatrix} w_i \\ z \end{pmatrix} \middle| \begin{pmatrix} \mu_{w_i} \\ \mu_z \end{pmatrix}, \Sigma\right) \text{ or}$$

$$f_i(w_i) = N(w_i | \mu_{w_i}, L_{w_i w_i}) = \frac{1}{\sqrt{2\pi L_{w_i w_i}}} e^{-\frac{(w_i - \mu_{w_i})^2}{2L_{w_i w_i}}}.$$

Alternatively, the observation function $f_i$ may be related to $$N\left(\begin{pmatrix} w_i \\ z \end{pmatrix} \middle| \begin{pmatrix} \mu_{w_i} \\ \mu_z \end{pmatrix}, \Sigma\right) \text{ or } N(w_i | \mu_{w_i}, L_{w_i w_i}),$$

where z may denote subdata (which does not contribute to the causal variable $cv_i$) within the grounding data gD, $\mu_{w_i}$, $\mu_v$ may denote means fixed as zero vectors, $\Sigma$ may be parameterized by Cholesky decomposition to satisfy, for example, $\Sigma = LL^T$. The matrix L may be a lower-triangular matrix with positive diagonals and may, for example, be parameterized to satisfy $$L = \begin{pmatrix} L_{w_i w_i} & 0 \\ M_{z w_i} & L_{zz} \end{pmatrix}.$$

Each of the matrixes $L_{w_i w_i}$, $L_{zz}$ may be smaller lower triangular matrixes. The matrix $M_{zw_i}$ may be any arbitrary matrix. Each of the matrixes $L_{w_i w_i}$, $L_{zz}$ may be parameterized by a summation of positive diagonal elements (guaranteed via an exponential map) and a lower triangular matrix (without positive diagonal elements).

Figure 8:
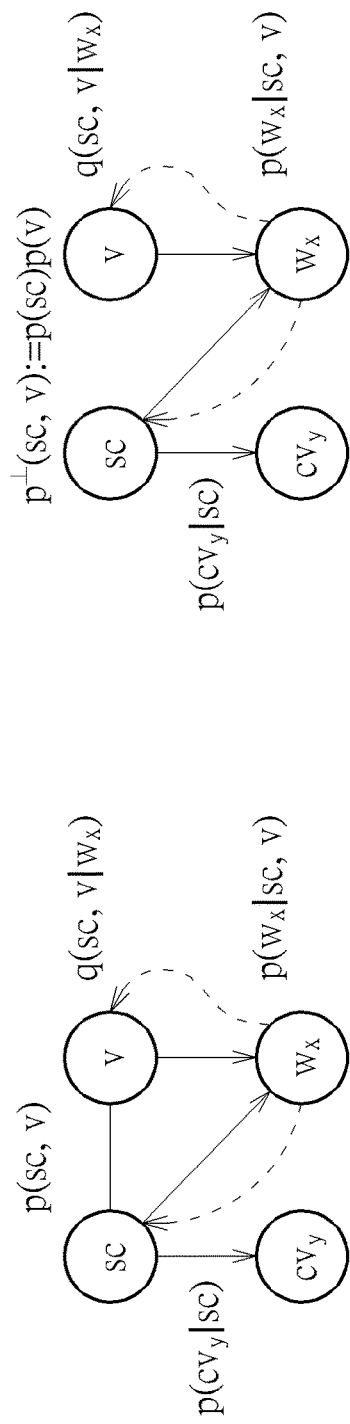
FIG. 8 is a schematic diagram of a causal variable and subdata according to an embodiment of the present invention.
Figure 8:
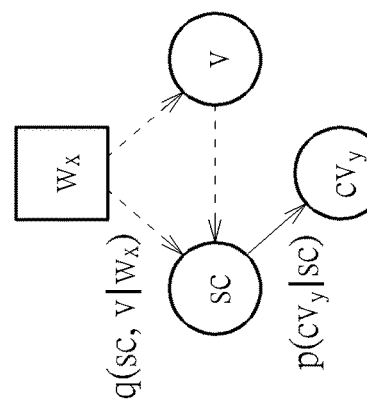
Figure 8:
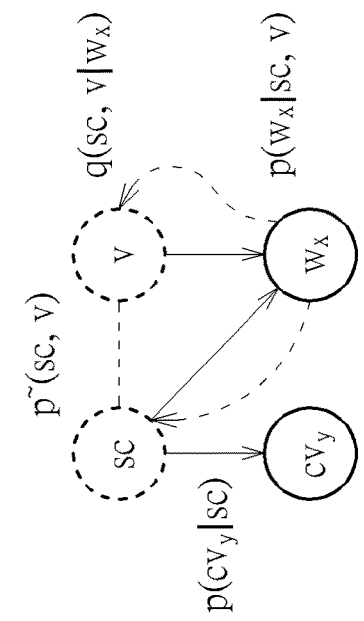

In one embodiment, the relationship between causal variables (e.g., $cv_i$) and subdata (e.g., $w_i$) may be unknown, but the causal variables may be predicted/inferred from the subdata using a CSG model. For example, FIG. 8 is a schematic diagram of a causal variable $cv_y$ and subdata $w_x$ according to an embodiment of the present invention, where (a), (b), (c), and (d) respectively illustrate structure possibilities of the CSG model, sc may represent a semantic factor, v may represent a variation factor, solid arrows may represent causal mechanisms $p(w_x|sc, v)$ and $p(cv_y|sc)$, dashed arrows may represent an inference model $q(sc,v|w_x)$ for learning. In (a) of FIG. 8, a solid undirected line between the semantic factor sc and the variation factor v may represent a domain-specific prior $p(sc, v)$. Compared with the solid undirected line between the semantic factor sc and the variation factor v in (a) of FIG. 8, (b) of FIG. 8 introduces an independent prior $p(sc, v):=p(sc)p(v)$ to reflect intervention so as to improve out-of-distribution generalization performance. Compared with the solid undirected line between the semantic factor sc and the variation factor v in (a) of FIG. 8, (c) of FIG. 8 introduces a prior $p^{\sim}(sc, v)$ presented by a dotted line between the semantic factor sc and the variation factor v to reflect intervention according to causal invariance principle so as to leverage unsupervised data. In one embodiment, the present invention may fit the CSG model $p:=\langle p(sc, v), p(w_x|sc, v), p(cv_y|sc)\rangle$ to subdata by maximizing likelihood, perform calculation using variational inference and evidence lower bound (ELBO), and use Monte Carlo to estimate expectations after applying reparameterization tricks.

Policy temporal causal variable(s) of the vectors $TCV_1$-$TCV_n$ may be a function of time (i.e., values at different time instants are different), and CBO treats causal variable(s) being output (e.g., the loss function L( ) and causal variable (s) being input (e.g., policy temporal causal variable(s) of the vectors $TCV_1$-$TCV_n$, and/or the independent variables $O_1$-$O_q$) as invariant independent variables, and disregards the existence of a temporal evolution in both the causal variable(s) being output and the causal variable(s) being input (i.e., whether the causal variable(s) being output and the causal variable(s) being input change over time), and thus breaks the time dependency structure existing among causal variables. While disregarding time may significantly simplify the problem, it prevents the identification of an optimal intervention at every time instant, and (especially in a non-stationary scenario) may lead to a sub-optimal solution instead of providing the current optimal solution at any time instant. Thus, the present invention may extend to DCBO at step S303, which offer/account for the causal relationship between causal variables and the causal relationship may evolve/change over time, and thus facilitates in scenarios where all causal effects in a causal graph vary over time.

Figure 9:
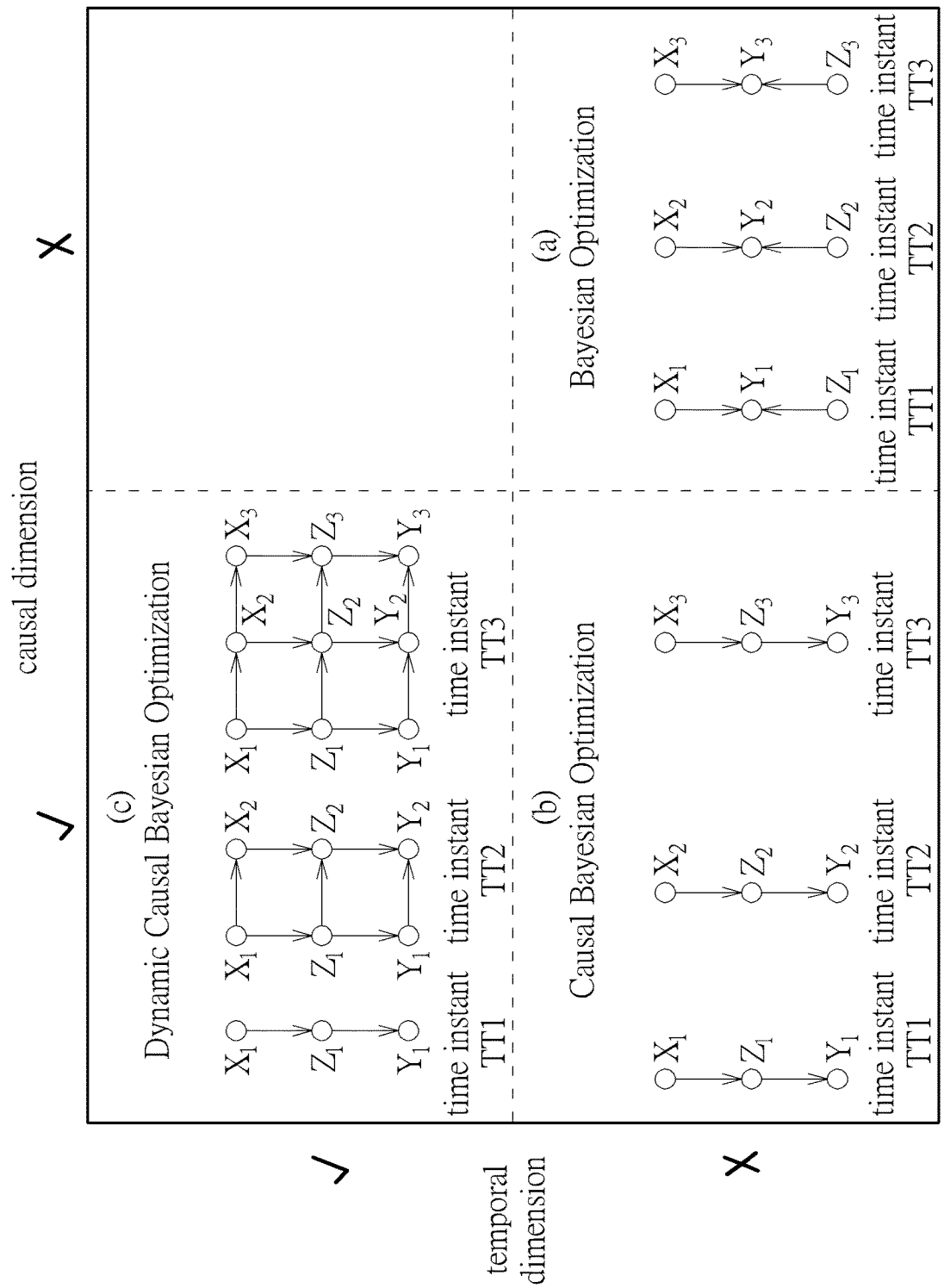
FIG. 9 is a schematic diagram of BO, CBO, and DCBO.

For example, FIG. 9 is a schematic diagram of BO, CBO, and DCBO. In FIG. 9 (a) or (b), $X_1$ to $X_3$ represent a causal variable (e.g., X) at three different time instants TT1, TT2, and TT3. $Y_1$ to $Y_3$ represent another causal variable (e.g., Y) at the time instants TT1, TT2, and TT3. $Z_1$ to $Z_3$ represent the other causal variable (e.g., Z) at the time instants TT1, TT2, and TT3. However, the present invention is not limited thereto and may extend to more time instants or more causal variables. DCBO combines BO and CBO to account for the causal relationships among causal variables, and the causal relationship may evolve over time. For example, in DCBO, as shown in FIG. 9, the causal variable $Y_1$ at the time instant TT1 is a function of the causal variable $Z_1$ at the time instant TT1; therefore, the extremum value of the causal variable $Y_1$ (which may represent or correspond to the loss function L( ) at the time instant TT1) may be found by using only the causal variable $Z_1$, which is directly related to the causal variable $Y_1$, and the causal intrinsic dimensionality is 1. Similarly, the causal variable $Y_2$ at the time instant TT2 is a function of the causal variable $Z_2$ at the time instant TT2 and the causal variable $Y_1$ at the time instant TT1; therefore, the extremum value of the causal variable $Y_2$ (which may represent or correspond to the loss function L( ) at the time instant TT2) may be found by using only the causal variable $Y_1$ and $Z_2$, which are directly related to the causal variable $Y_2$, and the causal intrinsic dimensionality is 2. Similarly, the causal variable $Y_3$ at the time instant TT3 (e.g., t4) is a function of the causal variable $Z_3$ at the time instant TT3 and the causal variable $Y_2$ at the time instant TT2; therefore, the extremum value of the causal variable $Y_3$ (which may represent or correspond to the loss function L( ) at the time instant TT3) may be found by using only the causal variable $Y_2$ and $Z_3$, which are directly related to the causal variable $Y_3$, and the causal intrinsic dimensionality is 2. In other words, a causal variable serving as a dependent variable at a time instant is a function of causal variable(s) at previous time instant(s) (serving either as dependent or independent variable(s)), and therefore the extremum value of the former (i.e., a causal variable serving as a dependent variable at a certain time instant) may be found by using only the latter directly related to the former (i.e., causal variable(s) serving either as dependent or independent variable(s) at previous time instant(s)).

In step S303, optimal/best alternative(s) for the QoS parameter(s) or QoS characteristic(s) (e.g., GFBR, MFBR, Maximum-PLR, PDB, or Maximum-PER) calculated/found by the algorithm (e.g., DCBO) are available or may be used for the policy temporal causal variable $QP_h$. Step S303 may avoid waiting until the network finds that QoS requirement(s) cannot be achieved; instead, remedial actions are taken before the network actually discovers the inability to meet QoS requirement(s), and thus the QoS parameter(s) or QoS characteristic(s) (e.g., GFBR, PDB, or Maximum-PER) used for an alternative profile may not be considered/used/necessary.

Step S304a: The PCF 3PCF, at a time instant t3 (e.g., the third time instant), may send the policy having been decided (e.g., the decided policy for the time instant t4) to the SMF 3SMF (e.g., by transmitting an Npcf_SMPolicyControl_UpdateNotify request). Step S304a may be corresponding to step S206.

Step S304b: The SMF 3SMF may in turn send a message (e.g., Namf_Communication_N1N2MessageTransfer) to the AMF 3AMF correspondingly.

Step S304c: The AMF 3AMF may correspondingly send a message (e.g., an N2 Message or an N2 Session Request) to the RAN 3RAN to modify QoS parameter(s) or QoS characteristic(s) of the QoS flow(s) inside the PDU session in question.

Step S305: The RAN 3RAN, at a time instant t4 (e.g., the fifth time instant), may modify or set/configure the QoS parameter(s) (e.g., QoS parameters of a QoS profile) or the QoS characteristic(s) (e.g., PDB, Maximum-PER, or other QoS characteristics) of the QoS flow(s) inside the PDU session in question corresponding/according to the (decided) policy (e.g., the policy temporal causal variables $QP_1$-$QP_n$, or Session-AMBR for the time instant t4) so as to control the flow rate, traffic, or speed of data flow(s) and avoiding the predicted QoS violation of the QoS violation prediction at the time instant t5.

In one embodiment, the storage circuit, configured to store image data or instructions, may be a read-only memory (ROM), a flash memory, a random access memory (RAM), a hard disk, a non-volatile storage device, a non-transitory computer-readable medium, but is not limited thereto. In one embodiment, the processing circuit, configured to execute instructions (stored in the storage circuit), may be a central processing unit (CPU), a microprocessor, or an application-specific integrated circuit (ASIC), but is not limited thereto.

The use of ordinal terms such as "first" and "second" does not by itself imply any priority, precedence, or order of one element over another, the chronological sequence in which acts of a method are performed, or the necessity for all the elements to be exist at the same time, but these terms are simply used as labels to distinguish one element having a certain name from another element having the same name. The technical features described in the following embodiments may be mixed or combined in various ways as long as there are no conflicts between them.

To sum up, the network may first predict whether there will be QoS violation and issue an incident prediction notification to the variable configuration device before the predicted QoS violation occurs so as to instruct the variable configuration device to decide the policy (i.e., how to set/configure QoS parameter(s) or QoS characteristic(s) of QoS flow(s)). This allows the network to set or modify the QoS parameter(s) or the QoS characteristic(s) of the QoS flow(s) according to the policy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A variable configuration method, for a variable configuration device, comprising:
   receiving an incident prediction notification from a network at a first time instant;
   determining at least one variable at a second time instant in response to the incident prediction notification, wherein the step of determining the at least one variable at the second time instant comprises maximizing a plurality of posterior probabilities of assigning a plurality of subdata of a grounding data to a plurality of observation functions and a causal structure to generate a causal graph, wherein one of the plurality of posterior probabilities is proportional to $\Pi_{t=0}^{T} P(w_{i,t}|s_{t-1}, C, f_i)$, where $S_{t-1}$ denotes a plurality of states of a plurality of causal variables at a time instant t-1, T denotes a fifth time instant earlier than a fourth time instant, C denotes the causal structure, $f_i$ denotes one of the plurality of observation functions, which is corresponding to an i-th causal variable of the plurality of causal variables, $W_{i,t}$ denotes one of the plurality of subdata, which is corresponding to the i-th causal variable, at a time instant t; and outputting the at least one variable at a third time instant, wherein the incident prediction notification is used to instruct the variable configuration device to determine the at least one variable to respond to a quality of service (QoS) violation prediction at the fourth time instant, and the third time instant is earlier than the fourth time instant.

2. The variable configuration method of claim 1, wherein the network is configured to predict inability to meet at least one QoS requirement at the fourth time instant according to a continuous time structural equation modeling to output the incident prediction notification.

3. The variable configuration method of claim 1, wherein the network is configured to compare at least one temporal causal variable at the fourth time instant with the at least one variable at the fourth time instant to perform the QoS violation prediction, and the at least one temporal causal variable constitutes a vector $\eta_h(t)$ which satisfies $$\eta_h(t) = e^{A(t-t_0)}\eta_h(t_0) + A^{-1}\left[e^{A(t-t_0)} - I\right]\xi_h +$$
$$A^{-1}\left[e^{A(t-t_0)} - I\right]Bz_h + M\sum_u x_{h,u}\delta(t-u) + \int_{t_0}^{t} e^{A(t-s)}GdW_h(s),$$

where A denotes a qualitative matrix, $t_0$ denotes an initial time instant, I denotes an identity matrix, $\xi_h$ denotes a random vector, B denotes a transformation matrix, $Z_h$ denotes a time-independent predictor vector, M denotes a coefficient matrix, $X_{h,u}$ denotes a time-dependent predictor vector, u denotes a pulse time instant, $W_h(s)$ denotes a random walk vector, and G denotes a lower triangular matrix.

4. The variable configuration method of claim 1, wherein
at least one temporal causal variable comprises a lowest flow bit rate, a highest flow bit rate, a packet loss rate, a session-aggregate bit rate, a user equipment-aggregate bit rate, a packet delay time, a packet error rate, or a data burst volume, and
the at least one variable comprises a guaranteed flow bit rate, a maximum flow bit rate, a maximum packet loss rate, a session-aggregate maximum bit rate, a user equipment-aggregate maximum bit rate, a packet delay budget, a maximum packet error rate, or a maximum data burst volume.

5. The variable configuration method of claim 1, wherein the at least one variable is decided at the second time instant according to Bayesian optimization, causal Bayesian optimization, or dynamic causal Bayesian optimization.

6. The variable configuration method of claim 1, wherein the network is configured to modify at least one QoS parameter or at least one QoS characteristic according to the at least one variable at the fifth time instant earlier than the fourth time instant, and the at least one variable is mapped to a minimum value of a loss function at the fifth time instant.

7. The variable configuration method of claim 1, wherein the causal structure of the causal graph between a loss function and the plurality of causal variables and the plurality of causal variables of the causal graph are determined together, and the plurality of causal variables comprising the at least one variable are selected from a plurality of independent variables.

8. The variable configuration method of claim 1, wherein the plurality of observation functions are obtained based on a causal semantic generative model.

9. The variable configuration method of claim 1, wherein a loss function at the fifth time instant is a function of the plurality of causal variables at the fifth time instant, the plurality of causal variables at least one time instant earlier than the fifth time instant, or the loss function at the at least one time instant.

10. A variable configuration device, comprising:
a storage circuit, configured to store a program code, wherein the program code comprises:
receiving an incident prediction notification from a network at a first time instant;
determining at least one variable at a second time instant in response to the incident prediction notification, wherein the step of determining the at least one variable at the second time instant comprises maximizing a plurality of posterior probabilities of assigning a plurality of subdata of a grounding data to a plurality of observation functions and a causal structure to generate a causal graph, wherein one of the plurality of posterior probabilities is proportional to $\Pi_{t=0}^{T}P(w_{i,t}|s_{t-1},C,f_i)$, $s_{t-1}$ denotes a plurality of states of a plurality of causal variables at a time instant t-1, T denotes a fifth time instant earlier than a fourth time instant, C denotes the causal structure, $f_i$ denotes one of the plurality of observation functions, which is corresponding to an i-th causal variable of the plurality of causal variables, $w_{i,t}$ denotes one of the plurality of subdata, which is corresponding to the i-th causal variable, at a time instant t; and
outputting the at least one variable at a third time instant, wherein the incident prediction notification is used to instruct the variable configuration device to determine the at least one variable to respond to a quality of service (QoS) violation prediction at the fourth time instant, and the third time instant is earlier than the fourth time instant; and
a processing circuit, coupled to the storage circuit and configured to execute the program code stored in the storage circuit.

11. The variable configuration device of claim 10, wherein the network is configured to predict inability to meet at least one QoS requirement at the fourth time instant according to a continuous time structural equation modeling to output the incident prediction notification.

12. The variable configuration device of claim 10, wherein the network is configured to compare at least one temporal causal variable at the fourth time instant with the at least one variable at the fourth time instant to perform the QoS violation prediction, and the at least one temporal causal variable constitutes a vector $\eta_h(t)$ which satisfies $$\eta_h(t) = e^{A(t-t_0)}\eta_h(t_0) + A^{-1}\left[e^{A(t-t_0)} - I\right]\xi_h +$$
$$A^{-1}\left[e^{A(t-t_0)} - I\right]Bz_h + M\sum_u x_{h,u}\delta(t-u) + \int_{t_0}^{t} e^{A(t-s)}GdW_h(s),$$

where A denotes a qualitative matrix, $t_0$ denotes an initial time instant, I denotes an identity matrix, $\xi_h$ denotes a random vector, B denotes a transformation matrix, $Z_h$ denotes a time-independent predictor vector, M denotes a coefficient matrix, $x_{h,u}$ denotes a time-dependent predictor vector, u denotes a pulse time instant, $W_h(s)$ denotes a random walk vector, and G denotes a lower triangular matrix.

13. The variable configuration device of claim 10, wherein
at least one temporal causal variable comprises a lowest flow bit rate, a highest flow bit rate, a packet loss rate, a session-aggregate bit rate, a user equipment-aggregate bit rate, a packet delay time, a packet error rate, or a data burst volume, and
the at least one variable comprises a guaranteed flow bit rate, a maximum flow bit rate, a maximum packet loss rate, a session-aggregate maximum bit rate, a user equipment-aggregate maximum bit rate, a packet delay budget, a maximum packet error rate, or a maximum data burst volume.

14. The variable configuration device of claim 10, wherein the at least one variable is decided at the second time instant according to Bayesian optimization, causal Bayesian optimization, or dynamic causal Bayesian optimization.

15. The variable configuration device of claim 10, wherein the network is configured to modify at least one QoS parameter or at least one QoS characteristic according to the at least one variable at the fifth time instant earlier than the fourth time instant, and the at least one variable is mapped to a minimum value of a loss function at the fifth time instant.

16. The variable configuration device of claim 10, wherein the causal structure of the causal graph between a loss function and the plurality of causal variables and the plurality of causal variables of the causal graph are determined together, and the plurality of causal variables comprising the at least one variable are searched out from a plurality of independent variables.

17. The variable configuration device of claim 10, wherein the plurality of observation functions are obtained based on a causal semantic generative model.

18. The variable configuration device of claim 10, wherein a loss function at the fifth time instant is a function of the plurality of causal variables at the fifth time instant, the plurality of causal variables a sixth time instant earlier than the fifth time instant, or the loss function at the sixth time instant.

* * * * *